July 28, 1959
L. SHAKESBY
2,896,697
SPOKE TIGHTENING HEAD
Filed May 14, 1957
3 Sheets-Sheet 2
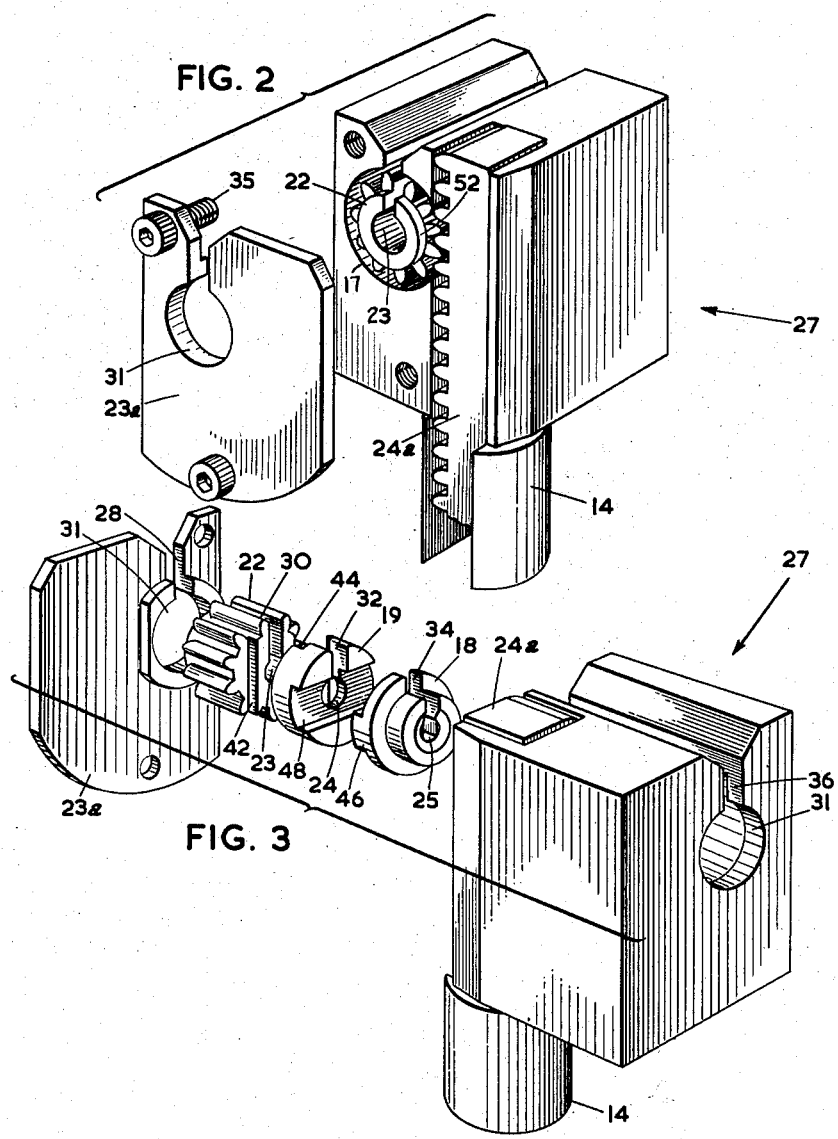
INVENTOR
LEONARD SHAKESBY
BY~ *Featherstonhaugh & Co.*
ATTORNEYS July 28, 1959  L. SHAKESBY  2,896,697
SPOKE TIGHTENING HEAD Filed May 14, 1957  3 Sheets-Sheet 3

INVENTOR
LEONARD SHAKESBY
BY Fetherstonhaugh & Co.
ATTORNEYS

United States Patent Office 2,896,697
Patented July 28, 1959

---

2,896,697
SPOKE TIGHTENING HEAD

Leonard Shakesby, Toronto, Ontario, Canada, assignor to Canada Cycle and Motor Company Limited, Weston, Ontario, Canada Application May 14, 1957, Serial No. 659,146

3 Claims. (Cl. 157—1.5)

This invention relates to spoke tightening machine having a number of heads each comprising a housing which contains a member adapted to key to a spoke nipple, a gear adapted to rotate said keying member, means for rotating said gear and means for positioning said head.

The invention in general terms, as well as the specific embodiment will be described with reference to the attached drawings in which:

Figure 2 is a view of the housing showing the gear rotating means.

Figure 3 is an exploded view showing the operative parts in the housing.

Figure 1:
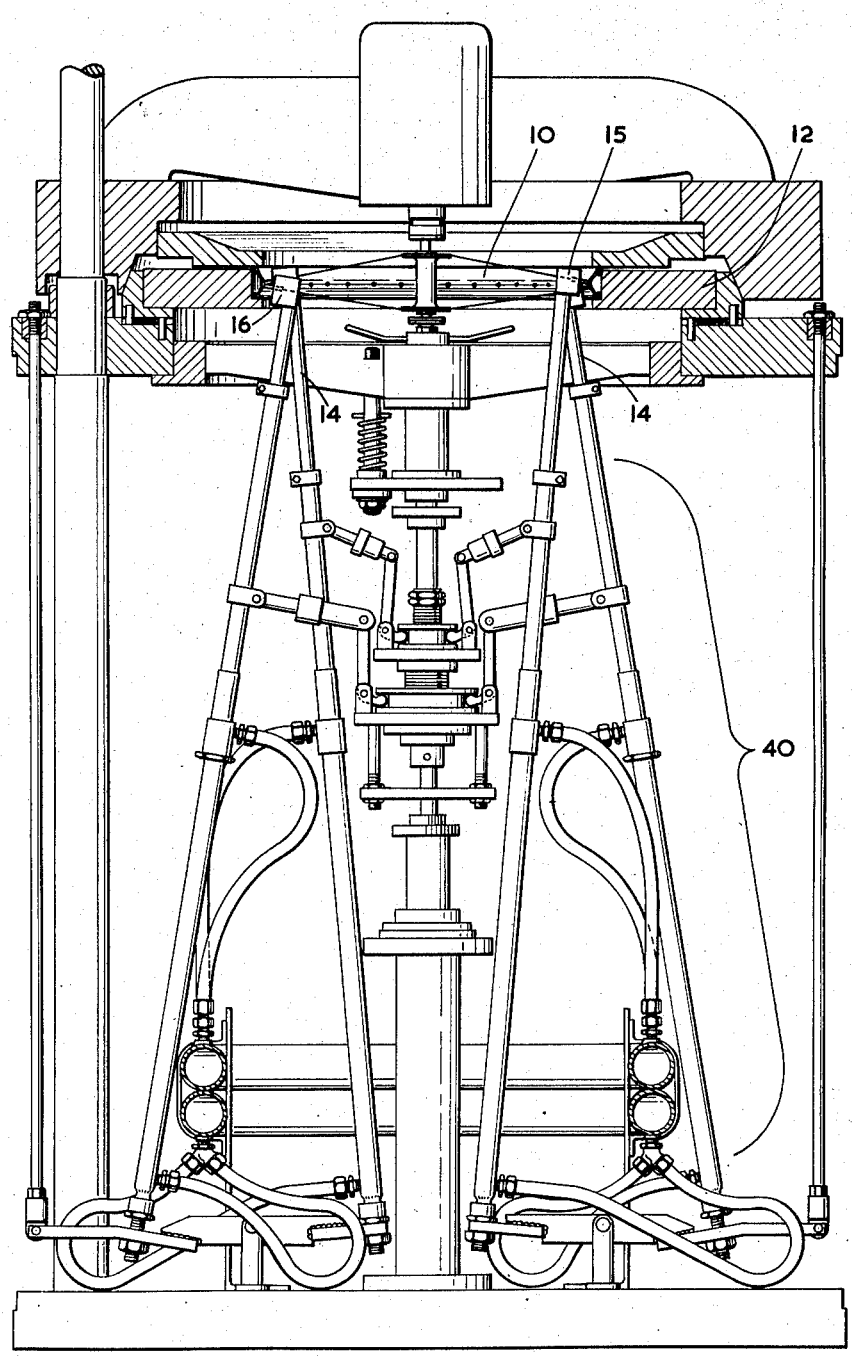
Figure 1 is a drawing of the spoke tightening machine as a whole.
Figure 4:
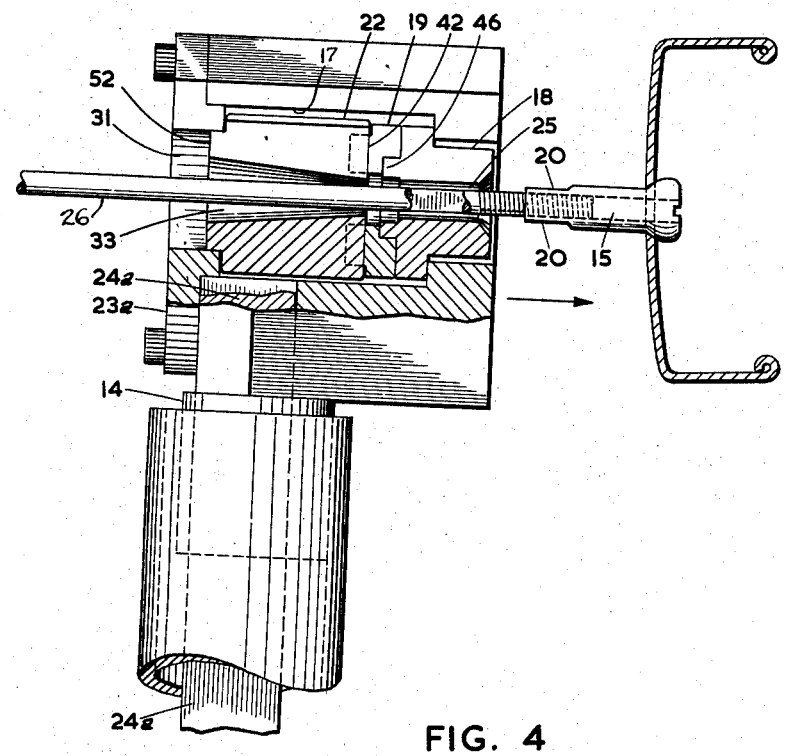
Figure 4 is a cut-away view of the housing about to tighten a spoke nipple.

The invention is intended to form a part of the spoke tightening machine illustrated in Figure 1 which is adapted to tighten the nipples on a bicycle wheel 10, a frame 12 being provided to hold the wheel 10 and the tightening apparatus. A number of tubular members 14 actuable from the frame 12 mount adjacent the wheel 10, a number of nipple-tightening heads 16. Reference now to Figures 2, 3 and 4 will indicate that the nipple tightening head 16 houses in a cylindrical bore 17, a spoke nipple contacting member 18 adapted to key to flats 20 on the spoke nipple and a gear 22 adapted to rotate contact member 18 through a junction member 19. The housing is provided with a smaller bore 31 coaxial with bore 17 at each end thereof. The bore 31 at the end adjacent gear 22 is defined by end plate 23a fastened to the housing by bolts 35. A rack 24a slidable in each tubular member 14 is adapted to mesh with the gear 22 and rotate it, and the rack 24a is provided with actuating means, which form no part of this invention. The gear 22, junction member 19 and nipple contacting member 18 are each provided respectively with a central bore 23, 24, 25 large enough to receive a bicycle spoke 26 therein, the bores being alignable as hereinafter discussed and there being provided alignable slots 28, 30, 32, 34 and 36 in respectively, the end plate 23a, gear 22, junction member 19 and nipple contacting member 18 and housing 27. Mechanism 40 is provided for raising housings 27 until the spoke is received in the centre of the gear 22, junction member 19 and contacting member 18 through slots 28, 30, 32, 34 and 36; then for moving contacting member 18 onto the nipple flats 20; and then for actuating the rack 24a to rotate gear 22 and the nipple.

Heretofore the gear 22, junction member 19 and contacting member 18 were made as a single member, and the alignment of the bore therein (equivalent to bores 23, 24, 25), with a spoke was achieved as far as was possible by the adjustment of the mechanism 40. However due to slight misalignment of the mechanism 40 or of the spoke, the bore and the spoke therein did not properly align and jamming and improper operation tended to take place in the nipple tightening operation.

In order to compensate for such misalignment, the torque connection between rack and nipple has been made in three parts; said gear 22 and said junction member 19 being provided with complementary ridge and groove surfaces 42 and 44 respectively allowing relative sliding of said gear 18 and junction member 19 in one direction transversely of said axis and relative to the junction member; said junction member 19 and said contacting member 18 being provided with cooperating ridge and groove surfaces 46 and 48 respectively allowing relative sliding of said members in another direction transversely of said axis and relative to the junction member 19. Preferably said two directions are at right angles to one another.

In this way the members 22—19—18 can move in both directions transverse to the spoke to conform to minor variations in the direction of the spoke relative to housing 27, and while so conforming will conveniently transmit torque from rack 24a to nipple flats 20. To assist in cooperation between the housing and the spoke, the spoke receiving bore 23 in gear 22 is conically shaped tapering inward in the direction of the spoke nipple, to allow for reasonable deviations in the spoke attitude relative to the housing 27.

Heretofore the gear 22 has been rotatable with the bore 17 acting as an exterior bearing. However under the asymmetrical torque applied by the rack 24a the gear 22 in being rotated is pressed against the walls of bore 17 and acts as a cutter to destroy such walls.

The end plate 23a has therefore been provided with the afore-mentioned reduced bore 31 coaxial with bore 17 and the gear is provided with a corresponding bearing ridge 52, adapted to slide in the reduced bore 31 and acting as a bearing for the gear. The bearing surfaces thus bear the load of the asymmetrical torque, and the teeth of gear 22 are prevented from cutting bore 17.

What I claim as my invention is:

1. A nipple turning head for a bicycle spoke tightening machine, said head comprising a housing; a cylindrical bore extending through said housing; a spoke accommodating slot in said housing leading into said bore; a gear rotatably mounted in said bore; a spoke nipple contacting member rotatably mounted in said bore; a junction member rotatably mounted in said bore and disposed between said gear and said nipple contacting member; a first set of cooperating ridge and groove surfaces between said gear and said junction member, allowing relative sliding of said members in one direction transversely of the axis of said bore; a second set of cooperating ridge and groove surfaces between said junction member and said contacting member allowing relative sliding of said members in another direction transversely of the axis of said bore; means for rotating said gear; an axial bore of somewhat larger diameter than a bicycle spoke in each of said gear, said junction member and said nipple contacting member; and alignable spoke accommodating slots in each of said gear, said junction member and said nipple contacting member, whereby a spoke may be located within said axial bores.

2. A nipple turning head as defined in claim 1, wherein said first direction is substantially at right angles to said second direction.

3. A nipple turning head as defined in claim 1, wherein said cylindrical bore communicates at the end thereof adjacent the end of said gear which is remote from said junction member with an aligned and coaxial bore of smaller diameter, and wherein said gear is provided with a reduced annular bearing extension designed to enter said aligned bore and provide a bearing for the gear.

References Cited in the file of this patent

UNITED STATES PATENTS

| | | |
|---|---|---|
| 1,489,645 | Mendenhall | Apr. 8, 1924 |
| 2,536,317 | Shakesby | Jan. 2, 1951 |
| 2,594,964 | Meyers | Apr. 29, 1952 |
| 2,616,323 | Leifer | Nov. 4, 1952 |